July 16, 1963

L. F. MOORE 3,097,589

DEEP FAT FRYER

Filed June 13, 1960

L. F. Moore INVENTOR

BY *C. A. Snow & Co.*

ATTORNEYS.

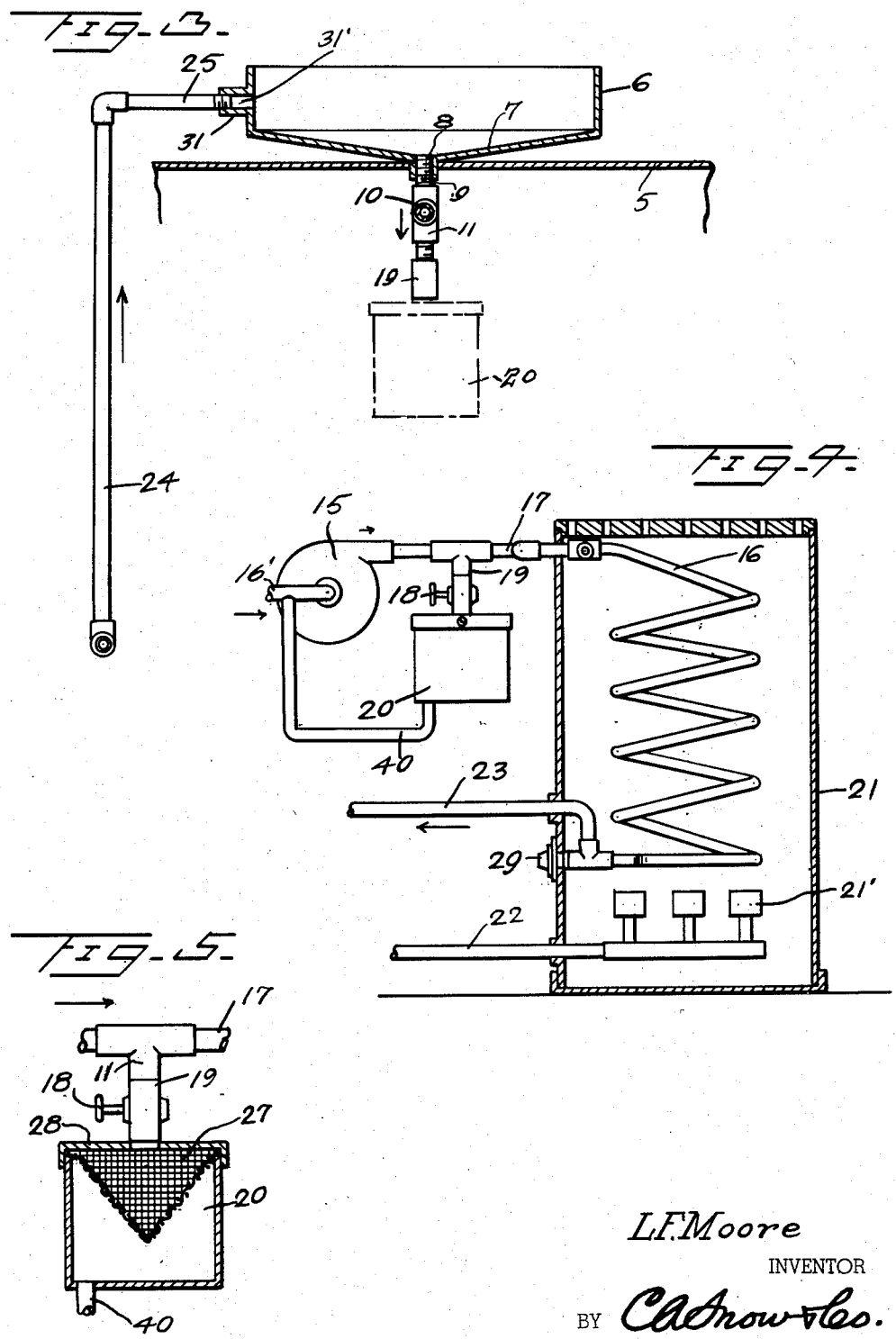

United States Patent Office 3,097,589
Patented July 16, 1963

3,097,589
DEEP FAT FRYER
Lewis F. Moore, % The Frymaster Corp., P.O. Box 7065, 410 Fortson St., Shreveport, La.
Filed June 13, 1960, Ser. No. 35,683
1 Claim. (Cl. 99—408)

This invention relates to a deep fat food frying apparatus, an important object of the invention being to provide a frying apparatus of this character wherein the thermal mass may be reduced to a minimum, due to the forced circulation of the thermal mass through a heating coil and the frying vat or header in which the food is being cooked.

Another important object of the invention is to provide means whereby the maximum of product uniformity will be maintained and insured, and any possibility of the over cooking or burning of the food will be eliminated.

A further object of the invention is to appreciably increase the period of time which a quantity of cooking fat may be used, and at the same time reduce the warm-up time and cooking period required for deep fat cooking, to a minimum.

A still further object of the invention is to provide means for filtering the cooking fat, removing sediment therefrom, during the operation of the frying, without affecting the efficiency of the apparatus.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings:

FIG. 3 is a sectional view taken on line 3—3 of FIG. 1.

FIG. 4 is a vertical sectional view through the heating unit.

FIG. 5 is a vertical sectional view through the filter.

Figure 1:
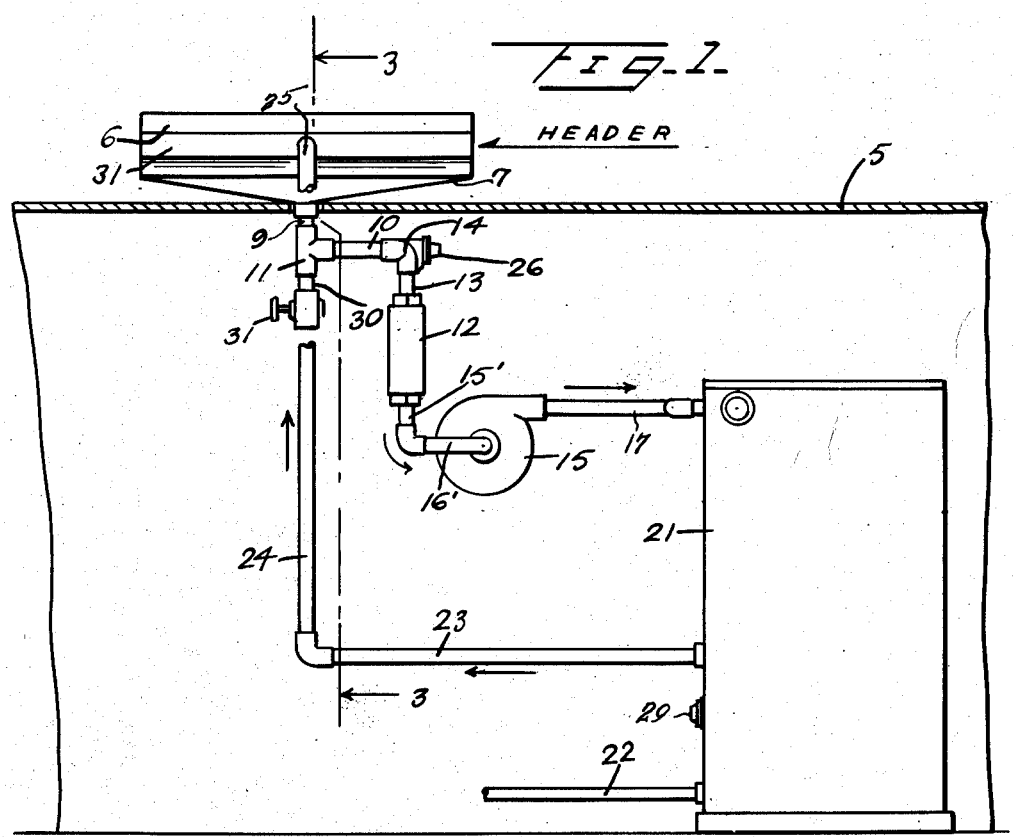
FIGURE 1 is an elevational view of a deep fat frying apparatus, constructed in accordance with the invention, illustrating the heating unit as located remote from the frying vat or header in which the deep frying is taking place.
Figure 2:
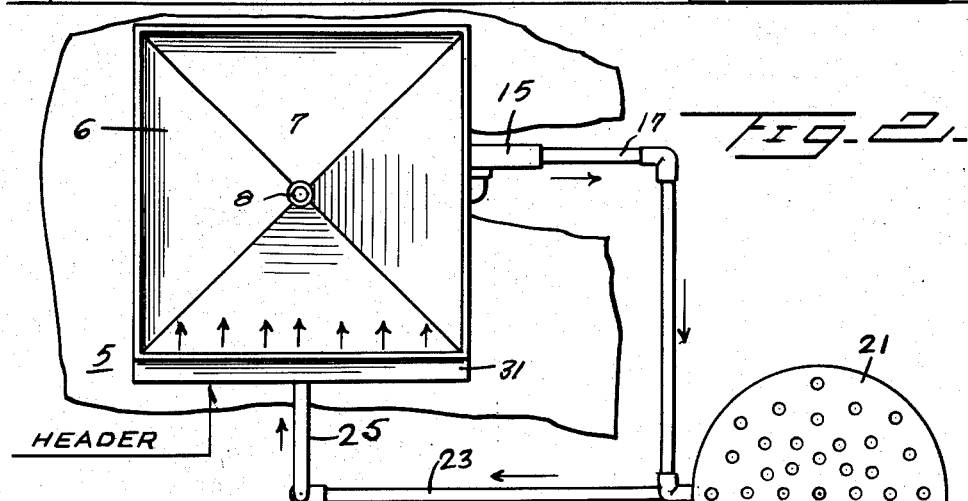
FIG. 2 is a plan view thereof.

Referring to the drawings in detail, the reference character 5 indicates a cabinet top, work table or the like on which the frying vat 6 is located, the frying vat 6 having an inclined bottom 7 so that the cooking will gravitate to the outlet opening 8, or openings of the frying vat, and exhaust through the opening 8 of the frying vat and exhaust through the pipe 9 connected thereto.

A pipe 10 is connected with the pipe 9 through the T union 11, the pipe 10 being connected with an optional in-line filter 12 through the pipe 13 and L coupling 14.

The reference character 15 indicates a circulating pump which is in communication with the in-line filter 12, through the pipes 15' and 16'.

The pump 15 communicates with one end of the heating coil 16, through the pipe 17, better shown by FIG. 4, which pipe 17 also affords means whereby a filter 20 such as indicated by FIG. 5 of the drawings, may be installed so that the cooking fat may be directed into the filter by operation of the valve 18 mounted in the pipe 19, which connects the pipe 17 with filter 20.

As better shown by FIG. 4 of the drawings, the heating coil 16 is mounted within the housing 21, the lower coil thereof being disposed directly over the burners 21' that are fed with fuel oil or gas, through pipe 22 leading from a suitable source of fuel supply.

While I have shown and described a gas burner, a suitable electric heating element may be used. Further, if desired, the fat may be heated in an open vat by means of a conventional heating element.

The lowermost coil of the heating coil 16 is connected with the pipe 23 that connects with the pipe 24, that in turn connects with pipe 25 leading into the frying vat 6. A thermostat 26 is mounted in the L-shaped coupling 14 and operates to cut off circulation of the fat when the temperature of the frying fat has reached a predetermined degree.

A suitable conventional filter 20 comprises a casing in which the inverted cone-shaped filtering element 27 is mounted, the filtering element 27 being constructed preferably of foraminous or unwoven cotton material so that by operating the valve 18, the hot cooking fat may be directed into the filter through the pipe 19, where the sediment will collect on the member 27. It will be obvious that the filter may be readily dismantled to remove the sediment by disconnecting the housing of the filter from the top 28 which is connected to the housing of the filter by any suitable removing mechanism.

A thermostat indicated by the reference character 29 is mounted within the end of the pipe 23 which connects with the lowermost coil of the heating coil, so that when the cooking fat has reached a predetermined degree of heat, the burner may be controlled to avoid overheating of the fat.

Should it be desired, a filter such as indicated by FIG. 5 of the drawings may be attached to the union 11 that communicated with the pipe 10, the control of cooking fat into the filter being regulated by the valve also mounted in the pipe 30, above the filter. When a filter such as shown by FIG. 5 of the drawings is used, a return pipe 40 is connected between the bottom of filter 20 and pipe 16 (see FIG. 4), returning the filtered fat to the system for circulation by pump 15. The pipe 24 connects with a horizontal pipe 31 through pipe 25, the pipe 31 being located along one edge of the frying vat 6, the pipe 31 having a plurality of openings 31' communicating with the frying vat, through which the hot fat is directed into the frying vat, the openings being so arranged that an even distribution of the fat throughout the frying vat is insured for uniform cooking.

It might be stated that the frying section may be of the single vat or multiple vat type, with or without a conveyor or mechanical basket or screen lift, and in multiple vat arrangements. Any or all vats could be used independently of one another for maximum flexibility.

It will be noted that due to the construction shown and described, the frying section need only be large enough to hold the frying baskets, since the circulation would eliminate the need for a larger thermal mass. In this way, warm-up time would be reduced to the minimum which is desirable in meeting various conditions of use.

Due to the construction shown and described, it will be obvious that the heater section of the apparatus may be located the desired number of feet from the frying section, the frying section occupying the active kitchen area which is frequently air conditioned and cooled, while the heating section is in another room out of the way so that the operator of the apparatus would not be subjected to the heat from the heating section.

What is claimed is:

An apparatus of the class described comprising a deep fat frying vat having a top and a bottom, a remote heater including a vertical housing having an interior and an exterior, a vertical heating coil having a lower end, an upper end and a lowermost coil and positioned within said housing, a feed pipe connected between the lower end of said heating coil, and offset therefrom, and the top of said deep fat frying vat through which frying fat is delivered from said heating coil to said vat, a line from the offset portion of said feed pipe to the exterior of said housing, a thermostatic control in said line, a return pipe connecting the upper end of said heating coil with said deep fat frying vat at the bottom thereof through which frying fat is returned from said deep fat frying vat to said heating coil, a pump in said return pipe for circulating hot fat through said pipes, a valve-controlled filter in said return pipe, offset with respect to said return pipe, and adapted to filter the circulating fat entering the upper end of said heating coil, a return pipe from said filter to said pump for recirculation of the filtered fat, a burner mounted directly under the lowermost coil of said heating coil adjacent said thermostatic control and frying fat to be circulated through said heating coil.

References Cited in the file of this patent

UNITED STATES PATENTS

| | | |
|---|---|---|
| 1,234,131 | Cleveland | July 24, 1917 |
| 1,659,415 | Thomas | Feb. 14, 1928 |
| 2,212,905 | Tota | Aug. 27, 1940 |
| 2,546,163 | McBeth | Mar. 27, 1951 |
| 2,633,108 | Sterick | Mar. 31, 1953 |
| 2,715,869 | Salvo | Aug. 23, 1955 |
| 2,780,984 | Kleeman | Feb. 12, 1957 |
| 2,860,917 | Thompson | Nov. 18, 1958 |